(12) United States Patent
Giunta et al.

(10) Patent No.: US 11,781,492 B2
(45) Date of Patent: Oct. 10, 2023

(54) TWO-SHAFT GAS TURBINE CONTROL SYSTEM AND METHOD

(71) Applicant: Nuovo Pignone Tecnologie S.R.L., Florence (IT)

(72) Inventors: Bruno Giunta, Massa (IT); Marco Palladino, Calenzano (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 0 days.

(21) Appl. No.: 17/251,098

(22) PCT Filed: Aug. 27, 2019

(86) PCT No.: PCT/IT2019/000067
§ 371 (c)(1),
(2) Date: Dec. 10, 2020

(87) PCT Pub. No.: WO2021/038604
PCT Pub. Date: Mar. 4, 2021

(65) Prior Publication Data
US 2022/0195947 A1    Jun. 23, 2022

(51) Int. Cl.
*F02C 9/22* (2006.01)
*F02C 9/54* (2006.01)
*F02C 3/10* (2006.01)

(52) U.S. Cl.
CPC .............. *F02C 9/22* (2013.01); *F02C 3/10* (2013.01); *F02C 9/54* (2013.01); *F05D 2260/96* (2013.01);
(Continued)

(58) Field of Classification Search
CPC ...... F02C 9/22; F02C 9/54; F02C 3/10; F05D 2270/024; F05D 2270/07; F05D 2270/304; F05D 2260/96
See application file for complete search history.

(56) References Cited

U.S. PATENT DOCUMENTS 5,184,526 A    2/1993   Watanabe

FOREIGN PATENT DOCUMENTS

EP    3225812 A1    10/2017
GB    1018729 A     2/1966
(Continued)

OTHER PUBLICATIONS

International Search Report and Written Opinion of International Application No. PCT/IT2019/000067 dated May 18, 2020, 14 pages.

*Primary Examiner* — Loren C Edwards
(74) *Attorney, Agent, or Firm* — Mintz Levin Cohn Ferris Glovsky and Popeo, P.C.

(57) ABSTRACT

A two-gas shaft turbine control system (31) is disclosed. The gas turbine control system comprises a fuel controller (35), which receives a speed error signal, indicating whether the low-pressure turbine wheel (11) of the gas turbine (1) is rotating at the desired target speed. The gas turbine control system (31) further comprises an NGV controller (41), which receives a speed error signal, indicating whether the high-pressure turbine wheel (9) of the gas turbine engine (1) is rotating at the desired target speed. Two cross channel controllers are further provided. On the basis of a gas turbine model, a first cross channel controller (43) provides a fuel control modification signal, which is added to a control signal generated by the fuel controller (35). A second cross channel controller (45) provides an NGV control modification signal. The modification signals are aimed at reducing or canceling the effect of mutual interaction between fuel control and NGV control. A two-shaft gas turbine engine system and a method of operation are further disclosed.

10 Claims, 5 Drawing Sheets

(52) U.S. Cl.
CPC .... *F05D 2270/024* (2013.01); *F05D 2270/07* (2013.01); *F05D 2270/304* (2013.01)

(56) References Cited

FOREIGN PATENT DOCUMENTS

| | | | | |
|---|---|---|---|---|
| GB | 1321333 | A * | 6/1973 | ................ F02C 9/54 |
| GB | 1321333 | A | 6/1973 | |
| GB | 2474761 | A | 4/2011 | |
| JP | H01294917 | A | 11/1989 | |

\* cited by examiner

TWO-SHAFT GAS TURBINE CONTROL SYSTEM AND METHOD

CROSS-REFERENCE TO RELATED APPLICATIONS

The present application is a U.S. national stage application filed under 35 U.S.C. § 371 of International Patent Application No. PCT/IT2019/000067 filed Aug. 27, 2019, the entire contents of which are incorporated herein by reference.

TECHNICAL FIELD

The present disclosure relates to gas turbine engines as well as to control systems and methods thereof. Embodiments disclosed herein specifically relate to two-shaft or dual-shaft gas turbine engines and their control systems and methods.

BACKGROUND

Gas turbine engines are commonly used as prime movers to drive a load, such as an electrical generator, or a compressor. Gas turbine engines are comprised of a compressor section, a combustor section and a turbine section. Air is ingested by the compressor section, compressed by the rotating impellers of the compressor and delivered to the combustor section. In the combustor section compressed air is mixed with fuel and the air-fuel mixture is burnt to produce hot, compressed combustion gas. The combustion gas is subsequently expanded in the turbine section to generate mechanical power through expansion. A portion of the mechanical power generated in the turbine section is used to drive the air compressor(s) in the compressor section. The remaining mechanical power is made available on a turbine output shaft to drive a load coupled thereto.

The turbine section of a gas turbine engine may comprise one or more turbines or turbine wheels mounted on one or more rotation shafts. Two-shaft gas turbine engines (also named dual-shaft gas turbine engines) comprise a high-pressure turbine wheel and a low-pressure turbine wheel, this latter also referred to as power turbine or power turbine wheel.

Combustion gas is sequentially expanded through the high-pressure turbine wheel and the low-pressure or power turbine wheel. The high-pressure turbine wheel is supported on a first shaft for co-rotation therewith and the low-pressure or power turbine wheel is supported on a second shaft for co-rotation therewith. The first shaft is drivingly coupled to the compressor section, such that power generated by the high-pressure turbine wheel keeps the compressor section in rotation. The second shaft is drivingly coupled to the load, such that mechanical power generated by the low-pressure turbine wheel is used to drive the load. The first shaft and the second shaft are mechanically separated from one another, such that the first shaft can rotate at a first rotational speed and the second shaft can rotate at a second rotational speed, different from the first rotational speed.

EP3225812 discloses a two-shaft gas turbine engine and relevant control method of opening and closing the inlet guide vanes of the gas turbine for adjusting the operating condition of the gas turbine engine.

A further fuel control system and method for a two-shaft gas turbine engine is disclosed in GB2474761.

The rotational speed of the second shaft and of the low-pressure turbine wheel is usually adjusted by controlling the amount of fuel delivered to the combustor section. Load variations can be offset by adjusting the fuel flow rate, such that a desired rotational speed of the load is maintained. If a constant load rotational speed is required, such as in power generation applications, where the load is an electrical generator, the fuel flow rate will increase if the load increases (i.e. if the resistive torque on the second shaft increases), to prevent the second shaft and the load from slowing down. Conversely, if the load drops, the fuel flow rate will be reduced to prevent acceleration of the second shaft. A fuel control loop is thus provided, which maintains a constant load rotational speed by adjusting the fuel flow rate responsive to load variations.

Variable nozzle guide vanes (hereinafter also referred to as variable NGVs) are provided between the high-pressure turbine wheel and the low-pressure turbine wheel. The angular position of the NGVs can be adjusted by an NGVs actuator under the control of a gas turbine control unit, to adjust the rotational speed of the first shaft and of the high-pressure turbine wheel mounted thereon. The rotational speed of the first shaft can be set at a given value based on an operation curve of the gas turbine engine, for instance in order to maintain a controlled combustion temperature or exhaust gas temperature. If the actual rotational speed of the first shaft is lower than the required rotational speed, the NGVs will open. The opposite adjustment is performed if the detected rotational speed of the first shaft is higher than the required, pre-set rotational speed.

It has now been discovered that in some cases, adjusting the fuel flowrate to control the rotational speed of the second shaft, i.e. of the low-pressure turbine wheel, may have an undesired impact on the rotational speed of the first shaft and thus of the high-pressure turbine wheel, and vice-versa. This undesired mutual interaction between inputs (fuel flow rate, NGVs position) and outputs (speed of the high-pressure turbine wheel, speed of the low-pressure turbine wheel) results in oscillations, which adversely affect the efficiency of the gas turbine engine and the dynamic performance thereof.

SUMMARY

According to one aspect, a gas turbine control system is disclosed, which comprises a first rotational speed sensing system adapted to sense a first rotational speed of a high-pressure turbine wheel supported for rotation on a first shaft. The system can further comprise a first error calculator adapted to determine a first rotational speed error based on a first input signal from the first rotational speed sensing system and a first speed reference. The control system can further comprise a second rotational speed sensing system adapted to sense a second rotational speed of a low-pressure turbine wheel supported for rotation on a second shaft, and a second error calculator adapted to determine a second rotational speed error based on a second input signal from the second rotational speed sensing system and a second speed reference. The control system also comprises a nozzle-guide-vane controller adapted to provide a provisional nozzle-guide-vane control signal, which is a function of the first rotational speed error, and further a fuel controller adapted to provide a provisional fuel control signal, which is a function of the second rotational speed error.

The provisional control signals are corrected in order to prevent or limit undesired mutual interactions between inputs (fuel flow rate, NGVs position) and outputs (speed of the high-pressure turbine wheel, speed of the low-pressure turbine wheel).

For this purpose, the control system further comprises a first cross channel controller coupled respectively to the nozzle-guide-vane controller and to the fuel controller, and adapted to provide a fuel control modification signal based on the provisional nozzle-guide-vane control signal. Furthermore, the control system also comprises a second cross channel controller coupled respectively to the fuel controller and to the nozzle-guide-vane controller, and adapted to provide a nozzle-guide-vane control modification signal based on the provisional fuel control signal.

According to a further aspect, disclosed herein is a gas turbine engine system comprising a two-shaft gas turbine engine and a control system as described above.

According to a yet further aspect, disclosed herein is a method for operating a two-shaft gas turbine engine, comprising the following steps:

detecting a low-pressure turbine speed error between an actual rotational speed of the low-pressure turbine wheel and a speed reference value;

generating a provisional fuel control signal to offset the low-pressure turbine speed error;

detecting a high-pressure turbine speed error between the actual rotational speed of the high-pressure turbine wheel and a speed reference value;

generating a provisional variable nozzle guide vane control signal to offset the high-pressure turbine speed error;

correcting the provisional fuel control signal with a fuel control modification signal, which offsets the interaction of the fuel control signal on the rotational speed of the high-pressure turbine wheel; and correcting the provisional variable nozzle guide vane control signal with a variable nozzle guide vane control modification signal, which offsets the interaction of the variable nozzle control signal on the rotational speed of the low-pressure turbine wheel.

Further features and embodiments are set forth in the detailed description below and in the attached claims.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Figure 1:
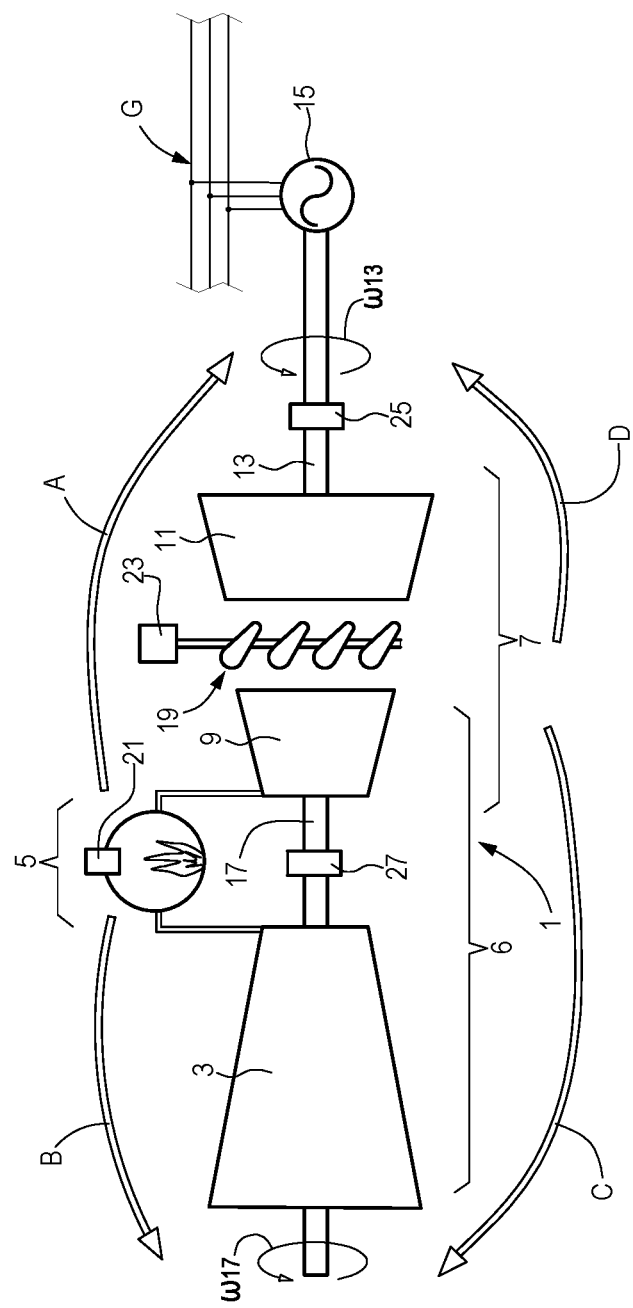
FIG. 1 illustrates a schematic of a two-shaft gas turbine engine illustrating the mutual effects of parameter changes on the machine.

As briefly discussed above, in two-shaft gas turbine engines a mutual interaction may exist between the control of the low-pressure turbine wheel, also referred to as power turbine wheel or simply power turbine, and the control of the high-pressure turbine wheel. By adjusting the fuel flow rate in order to counterbalance a speed variation of the low-pressure turbine wheel, a variation of the speed of the high-pressure turbine wheel can be induced. This is offset by acting upon the variable NGVs. Opening or closing the NGVs in turn affects the rotational speed of the low-pressure turbine wheel, however. This interaction is undesired. The control system and method disclosed herein use a dynamic model of the gas turbine engine to take into consideration the mutual interaction between the two control loops, on the speed of the low-pressure turbine wheel and on the speed of the high-pressure turbine wheel, to decouple the two control loops and reduce, prevent or remove oscillations induced by mutual interaction therebetween.

In short, the gas turbine control system disclosed herein comprises a fuel control loop, which includes a fuel controller. The fuel controller receives a speed error signal, which provides information on whether the low-pressure turbine wheel is rotating at the desired target speed, or if a speed error occurs. Based upon the speed error, the fuel controller generates a signal which is used to act upon a fuel actuator to modify the fuel flow rate. The gas turbine control system further comprises a variable NGVs control loop, which includes an NGV controller. The NGV controller receives a speed error signal, which provides information on whether the high-pressure turbine wheel is rotating at the desired target speed, or if a speed error occurs. Based upon the speed error, the NGV controller generates a signal, which is used to act upon an NGV actuator to modify the angular position of the variable nozzle guide vanes. Two cross channel controllers are further provided. On the basis of a gas turbine model, a first cross channel controller provides a fuel control modification signal, which is added to the control signal generated by the fuel controller and which is aimed at reducing or canceling the effect of the NGV displacement on the speed of the low-pressure turbine wheel. On the basis of the gas turbine model, the second cross channel controller provides an NGV control modification signal aimed at reducing or canceling the effect of the fuel flowrate modification on the speed of the high-pressure turbine wheel.

Various signals are disclosed below. It shall be appreciated that the signals can be analog signals, digital signals or data values stored in a memory location, such as a register or buffer. Various circuits and circuit portions are discussed below, such as for instance controllers, regulators, measurement and sensing circuits, devices or facilities. It shall be appreciated that the circuits, circuit portions, controllers, regulators, measurement and sensing systems and similar components of the control system can be implemented via discrete electrical components, integrated circuits and/or through execution of program instructions by a processor, as well as by means of a combination thereof. In other words, a circuit or portion thereof can be implemented via software, or via hardware or as a combination of software and hardware components.

Referring now to FIG. 1, a schematic of a two-shaft gas turbine engine (hereinafter also briefly referred to as "two-shaft gas turbine" or simply "gas turbine") 1 is illustrated. The gas turbine 1 includes a compressor section 3, a combustor section 5 and a turbine section 7. The turbine section 7 includes a high-pressure turbine wheel 9 and a low-pressure turbine wheel 11, also referred to as power turbine wheel 11, or power turbine 11. Each turbine wheel 9, 11 can in actual fact be comprised of more than one turbine stage. For instance, the high-pressure turbine wheel 9 can include 1, 2, 3 or more turbine stages, each including a circular row of static nozzles and a circular row of blades mounted on a turbine disc. Similarly, the low-pressure turbine wheel 11 can include 1, 2, 3 or more turbine stages, each comprised of a circular row of static nozzles and a circular row of rotating blades. The first row of static nozzles can be a row of variable nozzle guide vanes, as described in more detail here below.

The high-pressure turbine wheel 9 is mounted on a first rotary shaft 17 for co-rotation therewith. The first shaft 17 drivingly couples the high-pressure turbine wheel 9 to the compressor section 3.

Variable nozzle guide vanes (shortly referred to as NGVs) 19 are arranged between the high-pressure turbine wheel 9 and the low-pressure turbine wheel 11. The position of the NGVs can be adapted to the operating conditions of the gas turbine 1 as will be described below.

The low-pressure turbine wheel 11 is mounted on a second rotary shaft 13 for co-rotation therewith. The second shaft 13 can be drivingly coupled to a load 15, for instance an electrical generator, a compressor, a compressor train, or other. The mechanical coupling can be a direct coupling, e.g. if the low-pressure turbine wheel 11 rotates at the same rotational speed as the load 15. In other embodiments, a gearbox or another speed manipulation device can be arranged on a shaft line connecting the power turbine wheel 11 to the load 15.

The first shaft 17, the compressor section 3, the combustor section 5 and the high-pressure turbine wheel 9 cumulatively form a gas generator 6. Air is compressed by the compressor section 3, delivered to the combustor section 5 and mixed with fuel therein. The compressed air/fuel mixture is ignited in the combustor section 5 to generate hot, pressurized combustion gas, which is partly expanded in the high-pressure turbine wheel 9, to generate the power required to drive the gas generator 6, i.e. to rotate the compressor section 3. The partly expanded combustion gas is delivered from the gas generator 6 through the low-pressure turbine wheel 11, where the combustion gas is further expanded to generate useful mechanical power available on the second shaft 13 to drive the load 15. By acting upon the variable NGVs the pressure drop across the high-pressure turbine wheel 9 and the low-pressure turbine wheel 11 can be modulated.

A fuel control actuator 21 controls the fuel flow rate delivered to the combustor section 5 in a manner and in response to signals to be described later on.

An NGVs actuator 23 controls the operation of the variable NGVs, and in particular can adjust the angular position thereof in a manner and in response to signals to be described later on.

A first rotational speed sensing system, for instance a first rotational speed sensor 27, is provided to detect the rotational speed of the first shaft 17, and therefore of the high-pressure turbine wheel 9 and of the compressor section 3. A second rotational speed sensing system, for instance a second speed sensor 25, is further provided to detect the rotational speed of the second shaft 13 and thus of the low-pressure turbine wheel 11 and of the load 15. The rotational speed sensors can measure the rotational speed of the relevant shaft directly, or can detect a rotational speed of a component mounted on the respective shaft for co-rotation therewith.

During steady state operation of the gas turbine engine 1 the load 15 rotates at a constant speed. All other parameters remaining the same, both turbine wheels 9 and 11 rotate at constant speed, though not necessarily the same rotational speed.

Often, for instance in oil and gas applications, the load 15 can be an electrical generator operating in island mode, i.e. is not coupled to a public electrical power distribution grid. Thus, a variation of the electrical load will cause a variation of the resistive torque on the electrical generator. If, for instance, a higher electrical power demand is applied to a local electrical power distribution grid G, whereto the electrical generator 15 is coupled, the resulting higher resistive torque on the second shaft 13 slows down the second shaft 13, thus decreasing the rotational speed $\omega 13$ thereof. The speed variation is detected by the second rotational speed sensor 25.

To offset the speed drop, the gas turbine controller (not shown in FIG. 1) acts upon the fuel actuator 21 to increase the fuel flow rate delivered to the combustor section 5, thus generating more mechanical power. The effect, schematically represented by arrow A, of the increased fuel flow rate is an acceleration of the second shaft 13, such that the latter is brought back to the pre-set rotational speed.

However, the modified fuel flow rate also affects the rotational speed $\omega 17$ of the first shaft 17, which is detected by the first rotational speed sensor 27. In fact, the increased fuel flow rate makes more power available also to the high-pressure turbine wheel 9, which thus accelerates the first shaft 17 and the compressor section 3. This effect is schematically represented by arrow B and is an undesired side effect of the change in fuel flow rate.

The speed variation of the first shaft 17 is offset by acting upon the NGVs actuator 23, which partially closes the variable NGVs 19, i.e. reduces the flow passage between the NGVs. The reduction of the flow passage downstream of the high-pressure turbine wheel 9 causes a reduction of the pressure drop, and thus of the enthalpy drop across the high-pressure turbine wheel 9. A consequence of the reduced enthalpy and pressure drop across the high-pressure turbine wheel 9 is a reduction of the mechanical power generated by the high-pressure turbine wheel 9, which in turn causes the rotational speed $\omega 17$ of the first shaft 17 to drop and to be brought back to the pre-set value. This effect is represented by arrow C.

However, as a side effect, the action on the variable NGVs 19 also affects the rotational speed $\omega 13$ of the second shaft 13, which tends to increase. This is because the enthalpy drop available across the low-pressure turbine wheel 11 increases, and thus more power is generated by the low-pressure turbine wheel 11. This effect is schematically represented in FIG. 1 by arrow D and is an undesired side effect of the variable NGVs displacement on the operating conditions of the low-pressure turbine wheel 11. Consequently, the adjustment of the fuel flow rate to offset a speed variation of the second shaft 13 triggers an additional rotational speed increase as side effect of NGV adjustment.

In other words, the side effect of the NGVs movement on the rotational speed of the second shaft 13 adds to the direct effect of the fuel flow rate increase on said speed. Similarly, the fuel flow rate increase contributes to increase the speed of the first shaft 17 and calls for an additional narrowing of the variable NGVs 19.

Arrows A and C show the direct effects, which are provoked by acting upon the actuators 21 and 23. Arrows B and D represent the mutual interaction between the inputs (fuel flow rate and NGV position) and the outputs (speed of the high-pressure turbine wheel 9 and of the low-pressure turbine wheel 11).

If no corrective measures are taken, the mutual interactions described above may trigger an oscillation of the gas turbine control system, which in turn causes the rotational speed of the second shaft 13 to oscillate around the pre-set value, such that the correct operating point is reached again only after a delay, which may be unacceptable. In a power generation plant, for instance, a load variation can trigger an oscillation of the rotational speed of the load 15, which requires several tens of seconds to dampen.

Figure 2:
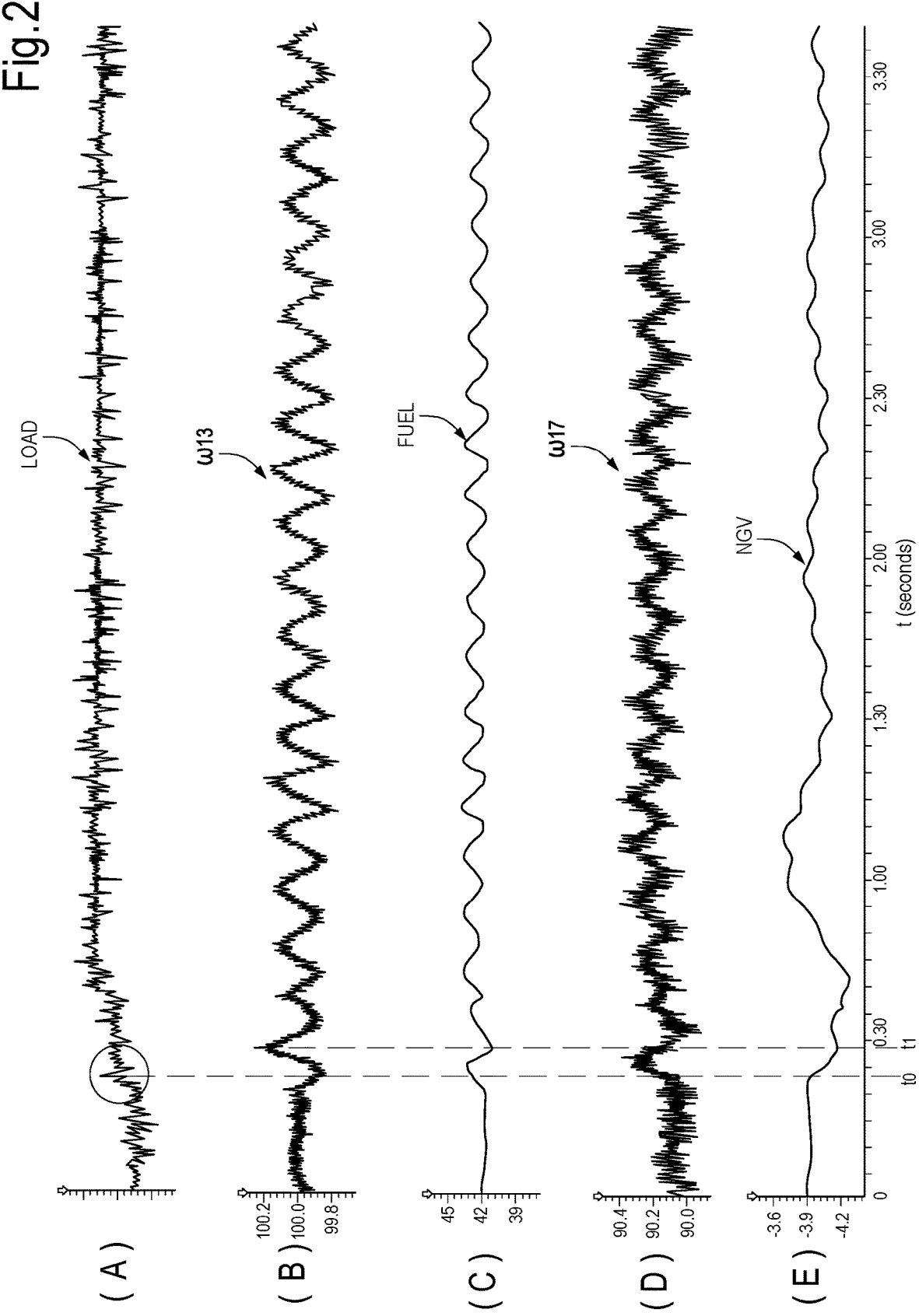
FIG. 2 illustrates the generation of persistent oscillations in machine parameters using a turbine control system of the current art.

FIG. 2, with continuing reference to FIG. 1, pictorially shows the effect of a load variation on several parameters of the gas turbine control. In each diagram of FIG. 2 time is plotted on the horizontal axis. The curve in FIG. 2A represents the load. A load variation occurrence is shown at time instant t0. Specifically, a load increase occurs, which causes a speed reduction of the second shaft 13, as shown in FIG. 2B. The gas turbine controller reacts to the rotational speed reduction by requesting a higher fuel flow rate, as shown by the curve in FIG. 2C, which reports the fuel demand signal vs. time. The increased fuel flow rate causes in turn an undesired increase of the rotational speed ω17 of the first shaft 17, as shown by the curve in FIG. 2D. The gas turbine controller reacts to the increased rotational speed ω17 by closing the variable NGVs 19 through NGV actuator 23, as shown in FIG. 2E, which plots the NGV actuator control signal vs. time.

The higher enthalpy drop made available across the low-pressure turbine wheel 11 brought about by closure of the variable NGV 19, causes the speed ω13 of the second shaft 13 to increase, as shown at instant t1 in FIG. 2A. Such speed increase is counteracted by a reduction of the fuel flow rate, which in turn causes a reduction of the rotational speed of the first shaft 17, offset by opening the variable NGVs 19. The resulting enthalpy drop reduction across the low-pressure turbine wheel 11 in turn calls for more fuel. This triggers an oscillation of the control system, which may last for several tens of seconds as shown in FIG. 2.

Figure 3:
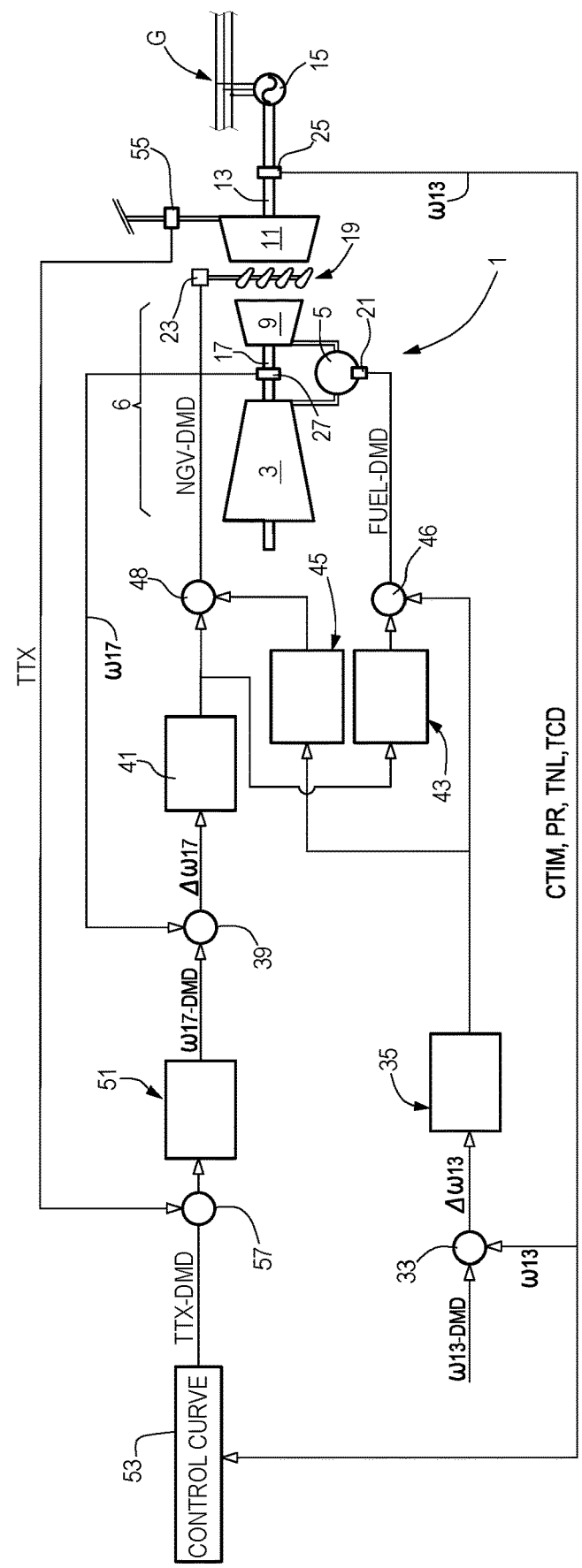
FIG. 3 illustrates a schematic block diagram of the control system of the present disclosure in one embodiment.
Figure 4:
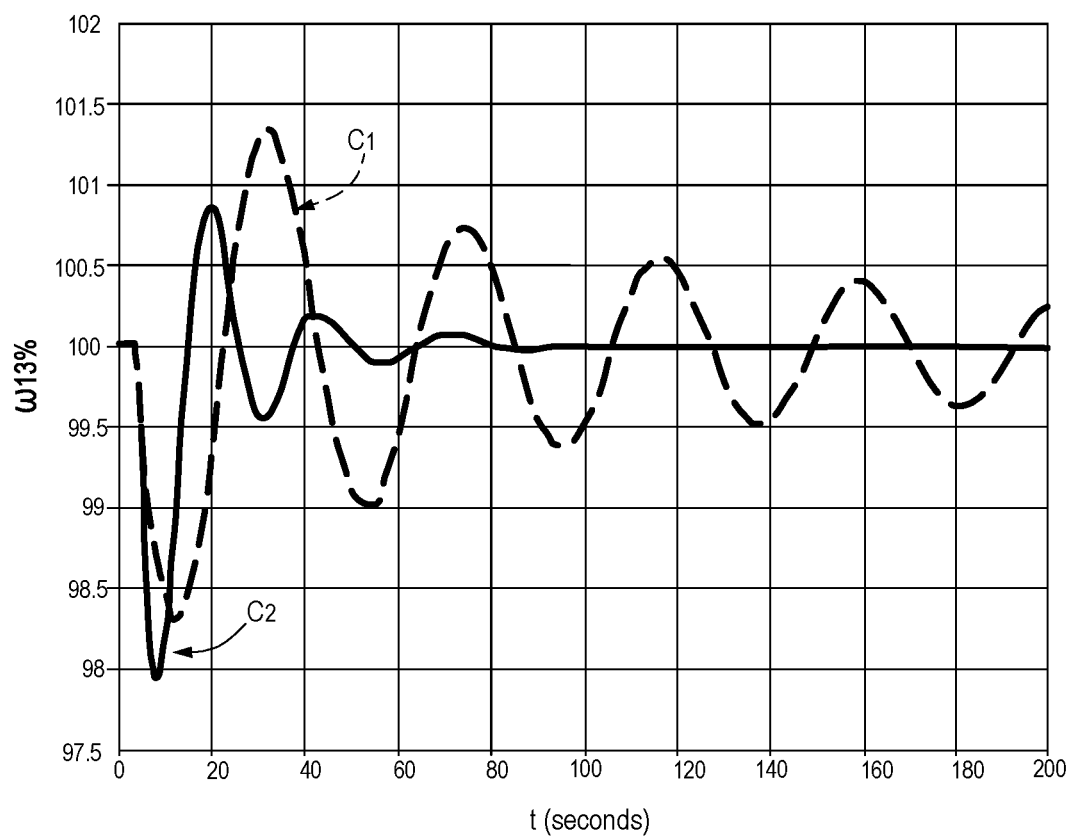
FIG. 4 illustrates a comparative diagram showing the behavior of the power turbine speed vs. time using a control system of the current art and a control system according to the present disclosure.
Figure 5:
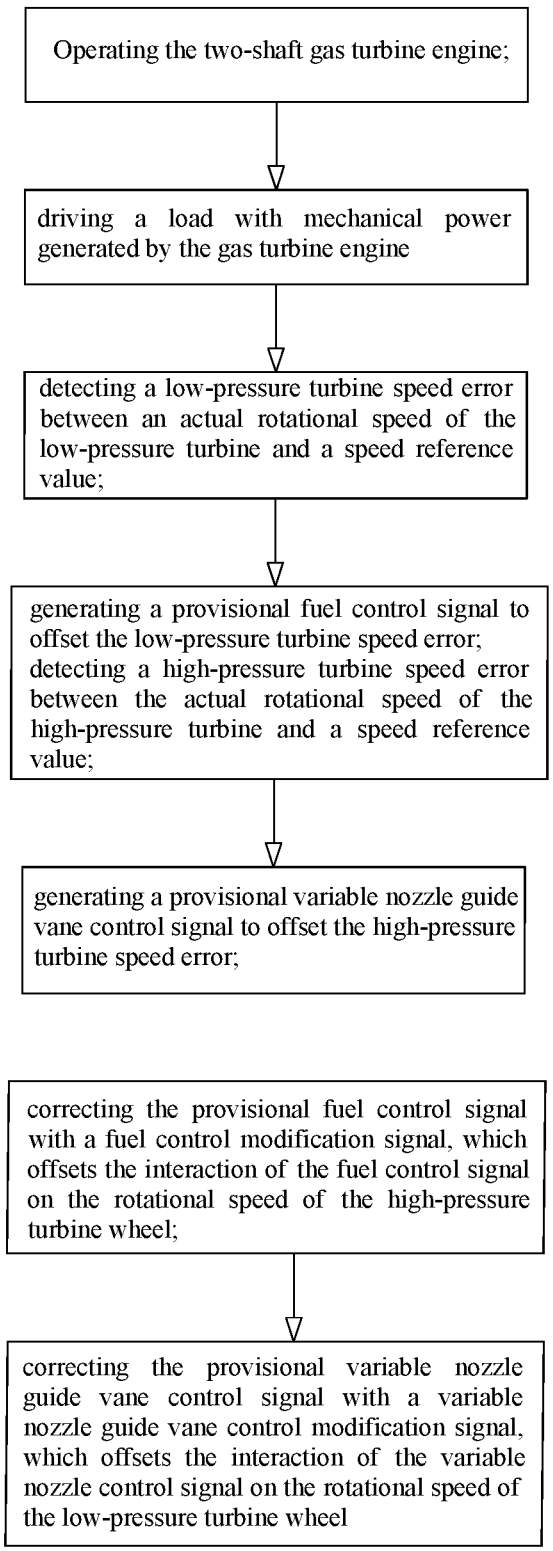
FIG. 5 illustrates a flow-chart summarizing a method according to the present disclosure.

FIG. 3, with continuing reference to FIGS. 1 and 2, illustrates an embodiment of a two-shaft gas turbine engine 1 and relevant control system according to the present disclosure, wherein features are provided to avoid or mitigate the above described mutual interaction between input and output signals. FIG. 4 illustrates the resulting damping effect on the speed oscillation following a load variation and consequent improved dynamic performance of the gas turbine engine 1.

In FIG. 3 reference number 31 designates the gas turbine control system as a whole. The control system 31 includes a first rotational speed error calculator 39, which calculates a first rotational speed error Δω17 based on the actual rotational speed ω17 of the first shaft 17, detected by the first rotational speed sensor 27, and a first rotational speed reference, i.e. a desired first rotational speed value ω17_DMD. The first rotational speed reference value ω17_DMD can be calculated as described later on, for instance based on a turbine control curve and on operative parameters of the gas turbine engine 1.

The control system 31 further includes a second rotational speed error calculator 33, which calculates a second rotational speed error Δω13 based on the actual rotational speed ω13 of the second shaft 13, detected by the second rotational speed sensor 25, and a second rotational speed reference, i.e. a pre-set desired second rotational speed value ω13_DMD.

For instance, if the required load rotational speed is constant, the reference value ω13_DMD is constant and the error signal calculated by the second rotational speed error calculator 33 is in fact the difference between the required constant rotational speed of the load 15 and the actual rotational speed detected by the second rotational speed sensor 25. While in the above described exemplary embodiment the speed set point is constant, those skilled in the art will understand that, in general, a variable speed set point can be used.

The control system 31 further includes a fuel controller 35, which contributes to provide a fuel control signal for the fuel control actuator 21, based on the second rotational speed error Δω13, calculated by the second rotational speed error calculator 33, and further based on a modification signal, the generation whereof will be described later on. The modification signal takes into account the mutual interaction between fuel control and NGV control. In some embodiments, the fuel controller 35 includes a regulator. In the schematic of FIG. 3, a second rotational speed error signal from the second speed error calculator 33 is applied at the inlet of the fuel controller 35, and this latter provides a provisional fuel control signal which, absent any interactions as described above, would offset the second rotational speed error Δω13.

The first rotational speed error Δω17 is applied to the inlet of a nozzle-guide-vane controller 41 (shortly "NGV controller 41"). In some embodiments, the NGV controller 41 includes a regulator. The NGV controller 41 provides a provisional nozzle-guide-vane control signal (shortly "provisional NGV control signal"). The provisional NGV control signal is used, in combination with a modification signal to be described, to act upon the NGV actuator 23 to modify the position of the variable NGVs 19. Absent any interaction as described above, the provisional NGV control signal would offset the first rotational speed error.

The control system 31 further includes a first cross channel controller 43, which is coupled to the NGV controller 41 and to the fuel controller 35. More specifically, the first cross channel controller 43 receives the provisional NGV control signal from the NGV controller 41 and provides a fuel control modification signal as an output signal. Such fuel control modification signal is combined with the provisional fuel control signal in a summing block 46, to provide a fuel control signal indicated as FUEL_DMD, which is applied to the fuel control actuator 21. The fuel control signal is thus based on a combination of a feedback from the fuel control loop, which includes the fuel controller 35, and of the output signal from the first cross channel controller 43, which takes into consideration the interaction of fuel flow rate variations on the rotational speed of the first shaft 17.

In the above sketched situation, where the rotational speed of the second shaft 13 increases as a consequence of partial closure of the variable NGVs 19, on the basis of a gas turbine model, and more specifically on the interaction of the NGV control signal on the rotational speed of the second shaft 13, the first cross channel controller 43 determines a fuel control modification signal which, when combined to the provisional fuel control signal provided by the fuel controller 35, partly or entirely counterbalances the effect of said interaction. As a matter of fact, the fuel control modification signal reduces the fuel demand which would be generated by the fuel controller 35 on the basis of the sole provisional fuel control signal.

As noted above, a load increase causes a slow-down of the second shaft 13, which in turn triggers, through the fuel controller 35, a fuel control signal aimed at increasing the fuel flow rate and thus the rotational speed of the second shaft 13, to reduce or eliminate the second rotational speed error. The modification signal applied by the first cross channel controller 43 to the provisional fuel control signal is such that the additional speed increase, which would be triggered as an undesired effect of mutual interaction between fuel controller 35 and NGV controller 41, is at least partly offset, in other words, the first cross channel controller 43 corrects the provisional fuel control signal generated by the fuel controller 35, such that the mutual interaction is taken into consideration.

Similarly, the control system 31 further includes a second cross channel controller 45, coupled to the fuel controller 35 and to the NGV controller 41. The second cross channel controller 45 provides an NGV control modification signal, which is summed, in a summing block 48, to the provisional NGV control signal generated by the NGV controller 41. The NGV control modification signal is based on the fuel control signal from the fuel controller 35. The resulting signal from the summing block 48 is an NGV control signal NGV_DMD, which is applied to the NGV control actuator 23. The NGV control signal is thus based on a combination of a feedback from the NGV control loop, which includes the NGV controller 41, and of the output signal from the second cross channel controller 45, which takes into consideration the interaction of NGV variations on the rotational speed of the second shaft 13.

As for the first cross channel controller 43, on the basis of the gas turbine model, and more specifically on the interaction of the fuel control signal on the rotational speed of the first shaft 17, the second cross channel controller 45 determines an NGV control modification signal which, when combined with the provisional NGV control signal, offsets the effect of said interaction.

The modification signals from the first and second cross channel controllers 43 and 45 allow to improve the dynamic performance of the gas turbine engine 1, as can be appreciated by the comparative diagram of FIG. 4. The rotational speed $\omega 13$ of the second shaft 13 is plotted on the vertical axis as a function of time (on the horizontal axis). The rotational speed is represented in terms of percentage of the pre-set steady-state speed, e.g. corresponding to 60 Hz or 50 Hz voltage frequency. Curve C1 represents the behavior of the rotational speed of the second shaft 13 when a conventional control is used to offset the decrease in rotational speed following a sudden load variation at instant t=0. After 200 seconds following the load variation the rotational speed of the second shaft 13 is still oscillating between 100.5% and 99.5% of the desired speed (100%). Curve C2 represents the rotational speed of the second shaft 13, if the control method and system of the present disclosure is used. Oscillations of the rotational speed decrease rapidly and become negligible already after 40 seconds from the load variation occurrence.

In the block diagram of FIG. 3 further control parameters are taken into consideration. Specifically, the first rotational speed reference value $\omega 17\_DMD$ can be calculated on the basis of current operating parameters of the gas turbine engine 1 based on a control curve, through a speed reference controller 51. A control curve block 53 receives as input data a plurality of turbine operating parameters, such as but not limited to ambient temperature, ambient pressure, load and provides as an output signal an exhaust temperature reference value TTX_DMD. A temperature sensor 55 determines the actual exhaust gas temperature, wherefrom the actual combustor temperature can be controlled. A temperature error calculator 57 calculates a temperature error and the speed reference controller 51 calculates therefrom the first rotational speed reference value $\omega 17\_DMD$.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A gas turbine control system, comprising:
a first rotational speed sensing system configured to sense a first rotational speed of a high-pressure turbine wheel supported for rotation on a first shaft of a gas turbine;
a first error calculator configured to determine a first rotational speed error based on a first input signal from the first rotational speed sensing system and a first speed reference;
a second rotational speed sensing system configured to sense a second rotational speed of a low-pressure turbine wheel supported for rotation on a second shaft of the gas turbine;
a second error calculator configured to determine a second rotational speed error based on a second input signal from the second rotational speed sensing system and a second speed reference;
a nozzle-guide-vane (NGV) controller configured to provide a provisional NGV control signal to an NGV actuator configured to adjust an angular position of one or more NGVVs arranged between the high-pressure turbine wheel and the low-pressure turbine wheel, said provisional NGV control signal being a function of the first rotational speed error;
a fuel controller configured to provide a provisional fuel control signal to a fuel actuator configured to control a fuel flow rate delivered to a combustor of the gas turbine, wherein the provisional fuel control signal is a function of the second rotational speed error;
a first cross channel controller coupled respectively to the NGV controller and to the fuel controller, and configured to provide a fuel control modification signal to the fuel actuator based on the provisional NGV control signal;
a second cross channel controller coupled respectively to the fuel controller and to the NGV controller, and configured to provide an NGV control modification signal to the NGV actuator based on the provisional fuel control signal;
the fuel actuator configured adjust the fuel flow rate delivered to the combustor of the gas turbine based on a sum of the provisional fuel control signal and the fuel control modification signal; and
the NGV actuator configured to adjust the angular position of the one or more NGVs based on a sum of the provisional NGV control signal and the NGV control modification signal.

2. The gas turbine control system of claim 1, wherein the fuel control modification signal is configured to reduce or remove an interaction of NGV control signal on the second rotational speed.

3. The gas turbine control system of claim 2, wherein NGV control modification signal is configured to reduce or remove an interaction of the fuel control signal on the first rotational speed.

4. The gas turbine control system of claim 3, further comprising a speed reference controller configured to calculate the first speed reference as a function of at least one turbine operation parameter.

5. The gas turbine control system of claim 1, further comprising a speed reference controller configured to calculate the first speed reference as a function of at least one turbine operation parameter.

6. The gas turbine control system of claim 1, wherein NGV control modification signal is configured to reduce or remove an interaction of the fuel control signal on the first rotational speed.

7. The gas turbine control system of claim 6, further comprising a speed reference controller configured to calculate the first speed reference as a function of at least one turbine operation parameter.

8. The gas turbine control system of claim 1, further comprising a speed reference controller configured to calculate the first speed reference as a function of at least one turbine operation parameter.

9. A gas turbine engine system comprising:
a two-shaft gas turbine engine comprising: a gas generator with a first shaft, a compressor section, a combustor section and a high-pressure turbine wheel mounted on the first shaft for co-rotation therewith; a low-pressure turbine wheel mounted on a second shaft for co-rotation therewith; and one or more nozzle guide vanes (NGVs) arranged between the high-pressure turbine wheel and the low-pressure turbine wheel; and
a gas turbine control system comprising
a first rotational speed sensing system configured to sense a first rotational speed of the high-pressure turbine wheel supported for rotation on the first shaft;
a first error calculator configured to determine a first rotational speed error based on a first input signal from the first rotational speed sensing system and a first speed reference;
a second rotational speed sensing system configured to sense a second rotational speed of the low-pressure turbine wheel supported for rotation on the second shaft;
a second error calculator configured to determine a second rotational speed error based on a second input signal from the second rotational speed sensing system and a second speed reference;
an NGV controller configured to provide a provisional NGV control signal to an NGV actuator configured to adjust an angular position of the one or more NGVs arranged between the high-pressure turbine wheel and the low-pressure turbine wheel, said provisional NGV control signal being a function of the first rotational speed error;
a fuel controller configured to provide a provisional fuel control signal to a fuel actuator configured to control a fuel flow rate delivered to the combustor section, wherein the provisional fuel control signal is a function of the second rotational speed error;
a first cross channel controller coupled respectively to the NGV controller and to the fuel controller, and configured to provide a fuel control modification signal to the fuel actuator based on the provisional NGV control signal;
a second cross channel controller coupled respectively to the fuel controller and to the NGV controller, and configured to provide an NGV control modification signal to the NGV actuator based on the provisional fuel control signal;
the fuel actuator configured adjust the fuel flow rate delivered to the combustor section based on a sum of the provisional fuel control signal and the fuel control modification signal; and
the NGV actuator configured to adjust the angular position of the one or more NGVs based on a sum of the provisional NGV control signal and the NGV control modification signal.

10. A method for operating a two-shaft gas turbine engine, comprising the following steps:
detecting a low-pressure turbine speed error between an actual rotational speed of a low-pressure turbine wheel and a speed reference value;
generating a provisional fuel control signal to offset the low-pressure turbine speed error;
detecting a high-pressure turbine speed error between an actual rotational speed of a high-pressure turbine wheel and a second speed reference value, wherein the high-pressure turbine wheel is supported for rotation on a first shaft and the low-pressure turbine wheel is supported for rotation on a second shaft; and wherein one or more variable nozzle guide vanes are arranged between the high-pressure turbine wheel and the low-pressure turbine wheel;
generating a provisional variable nozzle guide vane control signal to offset the high-pressure turbine speed error;
correcting the provisional fuel control signal by adding to it a fuel control modification signal, which offsets an interaction of the fuel control signal on the rotational speed of the high-pressure turbine wheel, to the provisional fuel control signal; and
correcting the provisional variable nozzle guide vane control signal by adding to it a variable nozzle guide vane control modification signal, which offsets an interaction of the variable nozzle control signal on the rotational speed of the low-pressure turbine wheel, to the provisional variable nozzle guide vane control signal;
providing the corrected provisional fuel control signal to a fuel actuator configured adjust a fuel flow rate delivered to a combustor of the gas turbine based on the corrected provisional fuel control signal; and
providing the corrected provisional variable nozzle guide vane control signal to a nozzle guide vane actuator configured to adjust an angular position of the one or more nozzle guide vanes based on the corrected provisional variable nozzle guide vane control signal.

* * * * *